United States Patent
Sung et al.

(10) Patent No.: US 9,680,549 B2
(45) Date of Patent: Jun. 13, 2017

(54) USER SCHEDULING AND BEAMFORMER DESIGN METHOD, APPARATUS, AND STORAGE MEDIUM BASED ON TWO-STAGE BEAMFORMER FOR MASSIVE MIMO DOWNLINK

(71) Applicant: KOREA ADVANCED INSTITUTE OF SCIENCE AND TECHNOLOGY, Daejeon (KR)

(72) Inventors: Youngchul Sung, Daejeon (KR); Gilwon Lee, Gyeonggi-do (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 136 days.

(21) Appl. No.: 14/617,202

(22) Filed: Feb. 9, 2015

(65) Prior Publication Data

US 2015/0230266 A1 Aug. 13, 2015

(30) Foreign Application Priority Data

Feb. 10, 2014 (KR) .......................... 10-2014-0014598

(51) Int. Cl.
*H04W 4/00* (2009.01)
*H04B 7/06* (2006.01)
(Continued)

(52) U.S. Cl.
CPC ......... *H04B 7/0626* (2013.01); *H04B 7/0413* (2013.01); *H04B 7/0452* (2013.01);
(Continued)

(58) Field of Classification Search
CPC .......... H04W 72/1263; H04W 72/1231; H04B 7/0413; H04B 7/0617; H04B 7/0626
(Continued)

(56) References Cited

U.S. PATENT DOCUMENTS

| | | | | |
|---|---|---|---|---|
| 2005/0075845 | A1* | 4/2005 | Thomas | G01S 19/21 702/189 |
| 2009/0252251 | A1* | 10/2009 | Tosato | H04B 7/0632 375/267 |
| 2015/0071190 | A1* | 3/2015 | Lau | H04B 7/0417 370/329 |

OTHER PUBLICATIONS

Sharif, M. et al.: "On the Capacity of MIMO Broadcast Channels With Partial Side Information"; IEEE Transactions on Information Theory, Vol. 51, No. 2, Feb. 2005.
(Continued)

*Primary Examiner* — Sai-Ming Chan
(74) *Attorney, Agent, or Firm* — Sheridan Ross. P.C.

(57) ABSTRACT

Disclosed herein are a user scheduling and beamformer design method, apparatus, and storage medium for multi-user MIMO downlink based on two-stage beamforming or single-stage beamforming. The user scheduling and beamformer design method includes 1) a two-step feedback approach, 2) the use of orthonormal reference beam vectors, 3) computation of the angle between the user's channel vector and each of the orthonormal reference beam vectors, 4) first-step feedback of the reference beam index to which the user's channel vector's angle is less than a certain threshold and feedback of the user's channel vector's norm, 5) selection of roughly orthogonal users with large channel norm based on the use of reference beam vectors and the channel norm feedback, 6) second-step feedback of the channel state information (CSI) from the scheduled users, 7) design of multi-user downlink beamformer for the scheduled users based on the second-step feedback of the CSI of the scheduled users. The main key point of this invention is that in the first step of user selection, we propose to use the channel norm or noise-plus-interference-divided channel norm as the feedback quantity and we propose to use only the angle between each of the reference beam vectors and
(Continued)

the user's channel vector to identify the closest reference beam vector.

7 Claims, 2 Drawing Sheets

(51) Int. Cl.
    *H04B 7/0413* (2017.01)
    *H04W 72/12* (2009.01)
    *H04B 7/0452* (2017.01)

(52) U.S. Cl.
    CPC ......... *H04B 7/0617* (2013.01); *H04B 7/0632* (2013.01); *H04W 72/1231* (2013.01)

(58) Field of Classification Search
    USPC ........................................................ 370/329
    See application file for complete search history.

(56) References Cited

OTHER PUBLICATIONS

Yoo, T. et al.: "On the Optimality of Multiantenna Broadcast Scheduling Using Zero-Forcing Beamforming"; IEEE Journal on Selected Areas in Communications, vol. 24, No. 3, Mar. 2006.
Adhikary, A. et al.: "Joint Spatial Division and Multiplexing: Opportunistic Beamforming and User Grouping"; Ming-Hsieh Department of Electrical Engineering, University of Southern California, CA; arXiv:1305.7252v1 [cs.IT] May 30, 2013.

* cited by examiner

USER SCHEDULING AND BEAMFORMER DESIGN METHOD, APPARATUS, AND STORAGE MEDIUM BASED ON TWO-STAGE BEAMFORMER FOR MASSIVE MIMO DOWNLINK

CROSS-REFERENCE TO RELATED APPLICATION

This application claims the benefit of Korean Application No. 10-2014-0014598 filed Feb. 10, 2014, the entire contents of which are incorporated herein by reference.

BACKGROUND OF THE INVENTION

1. Field of the Invention

The present invention generally relates to a user scheduling and beamformer design method, apparatus, and storage medium for multi-user multiple-input and multiple-output (MIMO) downlink based on two-stage MIMO beamforming as well as conventional single-stage MIMO beamforming.

2. Description of the Related Art

In wireless communication, the demand for high data rates has increased, and the necessity for the improvement of frequency efficiency has rapidly increased. In order to meet such necessities, a massive MIMO system in which a large number of antennas are employed into a base station to improve frequency efficiency is regarded as important technology for next-generation communication systems, and research into massive MIMO systems has actively been conducted all over the world.

In particular, in the situation of multi-user MIMO downlink in which a single base station simultaneously transmits data to multiple users, a method of efficiently scheduling users who will be actually provided with services, among all users in the cell who desire to be provided with the services, has been regarded as one of standardization-related important issues in Long-Term Evolution (LTE) and LTE-A (advanced) systems, and in-depth research into such methods is on-going. Conventional technologies related to the research are described below.

When the channels of all users are isotropically generated without having correlations, known user scheduling methods include user scheduling methods based on random beamforming disclosed in "On the capacity of MIMO broadcast channels with partial side information" by M. Sharif and B. Hassibi, *IEEE Transactions on Information Theory*, vol. 51, no. 2, pp. 506-522, 2005, and zero-forcing beamforming based on full channel state information (CSI) at the base station disclosed in "On the optimality of multiantenna broadcast scheduling using zero-forcing beamforming" by T. Yoo and A. Goldsmith, *IEEE Journal on Selected Areas in Communications*, vol. 24, no. 3, pp. 528-541, 2006. The random beamforming-based scheduling method has the advantage of significantly reduced feedback from users to the base station and yields reasonable performance. Hence, the random beamforming method has been extended and introduced even to environments in which channels are spatially correlated.

Recently, massive MIMO adopting large antenna arrays in base stations are gaining interest as a promising technology for future wireless communication systems for very high data rates, and user scheduling for massive multi-user MIMO is a hot research topic. As disclosed in "Joint spatial division and multiplexing: Opportunistic beamforming and user grouping" by A. Adhikary and G. Caire, arXiv: 1305.7252, May 2013, a very simple user scheduling method for massive multi-user MIMO downlink is recently proposed by extending and modifying an existing random beamforming method proposed by Sharif and Hassibi to an environment in which two-stage beamforming is used for massive MIMO. In the two-stage beamforming, users are partitioned into several subsectors (or groups) by the $1^{st}$ stage-beamformer and users within a subsector are separated by the $2^{nd}$ stage beamformer. Since in two-stage beamforming the $1^{st}$ stage beamformer is designed based on channel statistics information and the $2^{nd}$ stage beamformer is designed based on the effective channel composed of the product of the actual MIMO channel and the $1^{st}$ beamformer, the channel state information (CSI) for the second stage beamformer design is much reduced.

The random beamforming method applied to the conventional single-stage beamforming or two-stage beamforming case proposes a user scheduling and beamformer design method that is optimal only from the criterion of sum data rate scaling. Hence, it can be considered optimal only when a very large number of users are present, but it is not optimal in terms of sum rate itself and its sum rate performance degradation is severe in the range of the realistic range of user number. Hence, a new innovative scheduling and beamformer design method for multi-user MIMO downlink to overcome the drawback of the random beamforming is necessary.

SUMMARY OF THE INVENTION

The present invention has been made keeping in mind the above problems occurring in the prior art, and an object of the present invention is to provide a user scheduling and beamformer design method, apparatus, and storage medium for a massive MIMO downlink based on the aforementioned two-stage beamforming, which provide a user scheduling method better both in the date rate performance and in the feedback amount than a random beamforming-based user scheduling method. Although our invention is described assuming the aforementioned two-stage beamforming, the method and its scope are not limited to the two-stage beamforming. Our method and its scope are applied to the conventional single-stage beamforming case too.

In order to accomplish the above objects, the present invention provides a user scheduling and beamformer design method based on two-step feedback for two-stage beamforming based multi-user Multiple-Input-Multiple-output (MIMO) downlink as well as for conventional single-stage multi-user MIMO downlink, including 1) determining and using a reference orthonormal set of M transmit beam vectors $V_g=[u_g^1, \ldots, u_g^M]$, $g=1, \ldots, G$ ($\{u_g^1, \ldots, u_g^M\}$ are orthonormal vectors) as a reference, 2) transmitting these vectors to downlink for a training period, 3) distributing a preset threshold value $\alpha$ to the network, 4) partitioning the users in a subsector (or group) into M sets by computing the inner product between each of the reference transmit beam vector $u_g^i$, $i=1, \ldots, M$, and the user's normalized channel vector $h_{g_k}/\|h_{g_k}\|$ and comparing this inner product value to the threshold value $\alpha$, (by this step each user knows which reference beam is closest in angle to its channel vector. If the inner product value with the reference transmit beam vector $u_g^i$ is larger than the threshold, the user belongs to the reference beam set i.)

5) feedback from each user to the base station of the index i of the largest inner product value and each user's channel norm or interference-considering channel norm (which will be explained clearly later), 6) scheduling of a user for each reference transmit beam vector based on the feedbacked beam index and the feedbacked channel norm (or modified channel norm) information, 7) then, request of feedback of the channel state information (CSI) from only the scheduled users, (this step may require further downlink signaling)

8) multi-user beamformer design for the scheduled users after the feedback of the CSI of the scheduled users to adapt the reference transmit beam vectors accurately to the CSI of the scheduled users (this multi-user beamformer design may be based on zero-forcing (ZF) or minimum mean-square error (MMSE) beamforming), 9) and finally transmitting data to the scheduled users with the adaptively designed beam vectors.

Note that the first feedback step requires one integer number and one real number possibly from each user, and the second-step feedback requires the channel state information (CSI) only from the scheduled users. This two-step feedback approach significantly reduces the amount of feedback. Due to the use of a set of orthonormal reference beam vectors and the feedback of the aligned index and channel norm from each user from the first feedback step, our invention can select users that are roughly orthogonal and have large channel norms. This is one of the key ideas of our invention. Furthermore, we apply post-user-selection multi-user beamformer design for the scheduled users based on the CSI feedback from the scheduled users. The combination of selection of roughly orthogonal users with large channel norms and post-selection beam refinement based on the CSI from the scheduled users almost achieves the full CSI-based multi-user beamforming performance with far less feedback.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
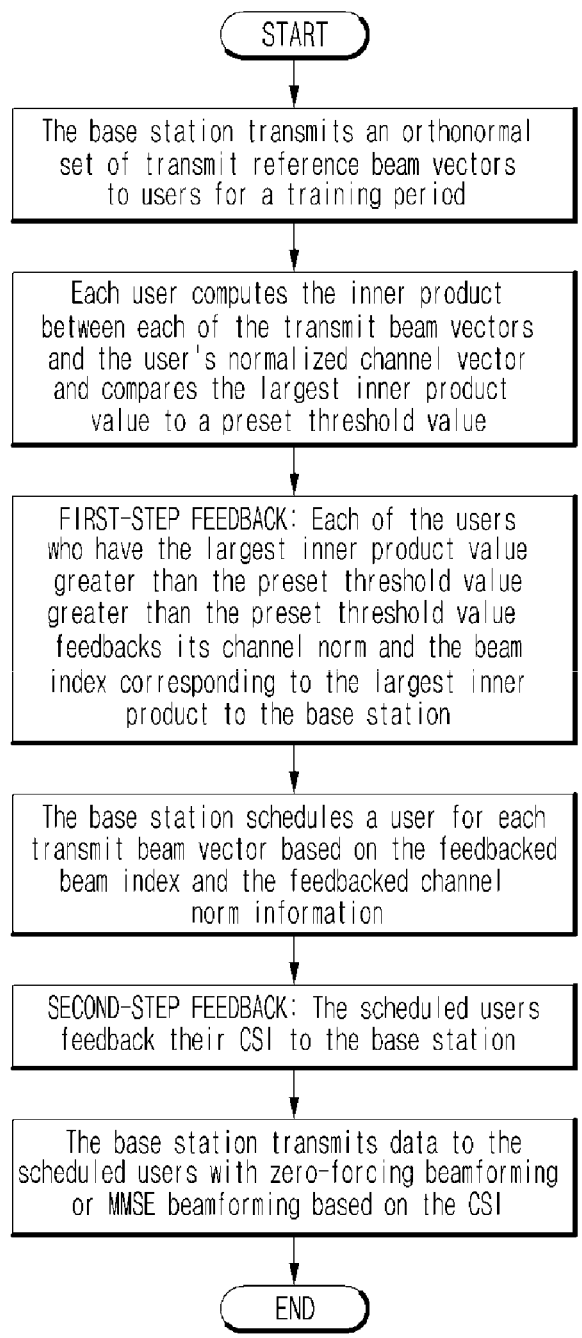
FIG. 1 is a flowchart showing a user scheduling method according to an embodiment of the present invention.
Figure 2:
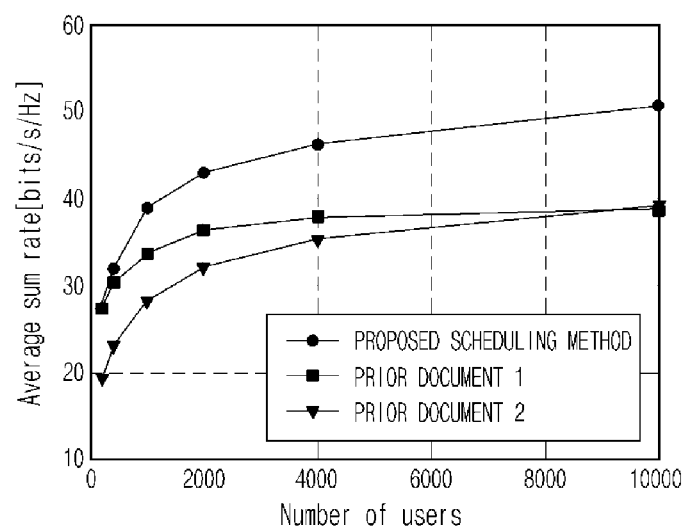
FIG. 2 is a graph showing a comparison between the performances of the user scheduling method according to the embodiment of the present invention and conventional scheduling methods.

Embodiments of the present invention are described with reference to the accompanying drawing FIG. 1. In the following description of the present invention, detailed descriptions of known functions and configurations which are deemed to make the gist of the present invention obscure will be omitted.

Further, in the present specification, the term "user" denotes a user terminal, and thus the user may be construed as the user terminal. the method of the present invention is implemented by a processor of a base station.

For the explanation purpose, we consider the following multiple-input single-output (MISO) channel model:

$$y_{g_k} = h_{g_k}^H x + n_{g_k} = h_{g_k}^H [V_1, \ldots, V_G] \text{diag}(W_1, \ldots, W_G) d + n_{g_k}$$

where x is the transmit signal vector, $y_{g_k}$ is the received signal at user k of group g, and $n_{g_k}$ is the noise vector at user k of group g. Here, we assume two stage beamforming $x = [V_1, \ldots, V_G]\text{diag}(W_1, \ldots, W_G)d$, where $\{V_1, \ldots, V_G\}$ are the pre-beamformers separating different groups, $\{W_1, \ldots, W_G\}$ are the post multi-user beamformers separating the users within each group, and d is the overall data symbol vector. Here, the pre-beamformer $V_g = [u_g^1, \ldots, u_g^M]$ for group g is nothing but a pre-determined set of orthonormal beam vectors $u_g^1, \ldots, u_g^M$ transmitted to the downlink. Writing the above equation focusing on user k of group g, we have $$y_{g_k} = h_{g_k}^H V_g W_g d_g + \sum_{g'} h_{g_k}^H V_g W_{g'} d_{g'} + n_{g_k},$$

where the first term on the right-hand side (RHS) of the above equation is the in-group signal and the second term is the inter-group interference. For two-stage beamforming, the product $g_{g_k} = h_{g_k}^H V_g$ of the pre-beamformer $V_g$ and the actual MIMO channel vector $h_{g_k}^H$ is referred to as the effective user channel.

Partitioning the set of users may include obtaining a set of users $W_i(\alpha)$ for each $i=1, \ldots, M$ by calculating the inner product of the user channel vector $h_{g_k}$ (or its normalize version $h_{g_k}/\|h_{g_k}\|$) and $u_g^i$, $i=1, \ldots, M$, and comparing this inner product value to the preset threshold value $\alpha$.

$$W_i(\alpha) = \left\{ k: \left| (u_g^i)^H \frac{h_{g_k}^H}{\|h_{g_k}^H\|} \right| \geq \alpha, k_g \in g_g \right\},$$

where $\alpha$ denotes a certain positive number satisfying $0 < \alpha < 1$. The above computation of the set $W_i(\alpha)$ may also be accomplished based on the effective channel $g_{g_k} = h_{g_k}^H V_g$ by computing the inner product between the normalized effective channel vector of each user and each ($e_{g_i}$) of the standard basis vectors with Equation (1), and determining whether to include each user in a given set $W_i(\alpha)$, $i=1, \ldots, M$, by comparing the inner product value to a preset number ($\alpha$), $$W_i(\alpha) = \left\{ k: \left| e_{g_i}^H \frac{g_{g_k}}{\|g_{g_k}\|} \right| \geq \alpha, k \in g_g \right\} \text{ where } \frac{g_{g_k}}{\|g_{g_k}\|} \quad (1)$$

denotes the normalized effective channel vector of each user k of group g, $e_{g_i}$ denotes the i-th standard basis vector $[0, \ldots, 1, 0, \ldots 0]$ (1 at the i-th position).

Partitioning the set of users may be configured to share the number ($\alpha$) satisfying $0 < \alpha < 1$ between the base station and the users in the cell, and the partitioning computation may be done at the user sites.

Scheduling may include feedback of information about the index of the set to which each user belong and feedback of the each user's channel norm $$\|g_{g_k}\|^2$$

or each user's channel norm divided by the total power of thermal noise and interference power from other subsector user signals, given by $$\frac{\|g_{g_k}\|^2}{\frac{1}{\rho} + S_g \sum_{g' \neq g} \|h_{g_k}^H V_{g'}\|^2} \quad (2)$$

User scheduling at the base station based on the user partition index and the user channel norm or the modified channel norm in Equation (2) compares the user channel norm (or the modified channel norm) of all users belonging to the same partition set and selects the user with the maximum channel norm (or the modified channel norm) for each transmit beam index. That is, performing the scheduling comprises calculating a user index required to maximize the modified channel norm in each partitioned user set by using the following Equation (3):

$$\pi_i = \underset{k \in W_i(\alpha)}{\operatorname{argmax}} \frac{\|g_{g_k}\|^2}{\frac{1}{\rho} + S_g \sum_{g' \neq g} \|h_{g_k}^H V_{g'}\|^2} \quad (3)$$

where $\pi_i$ denotes a finally selected user for $i=1, \ldots, M$, $\|g_{g_k}\|^2$ denotes a square of a norm of an effective vector of the k-th user in the g-th group, which is the square of the channel vector norm, $1/\rho$ denotes the magnitude of effective noise, $S_g$ denotes the number of data streams, $\|h_{g_k}^H V_g\|^2$ physically denotes the magnitude of the effective interference signal that is influenced by an other group (g'), and the modified channel norm $$\frac{\|g_{g_k}\|^2}{\frac{1}{\rho} + b_g \sum_{g' \neq g} \|h_{g_k}^H V_{g'}\|^2}$$

is defined as a quasi-SINR in this document. The quasi-SINR may be a lower bound value of the calculated SINR when multi-user MIMO beamforming is implemented using zero-forcing beamforming.

The key idea of this invention is the use of the channel norm or the modified channel norm like equation (3) incorporating the impact of the interference plus noise not the conventional SINR as used in "On the capacity of MIMO broadcast channels with partial side information" by M. Sharif and B. Hassibi, *IEEE Transactions on Information Theory*, vol. 51, no. 2, pp. 506-522, 2005.

The next key step of our invention is the feedback of the channel state information (CSI) from the scheduled users only once the user scheduling (or user selection) is done based on the feedback of the partition index and the (modified) channel norm from users. Note that the partition index and the (modified) channel norm are an integer number and a real number, respectively. After the CSI feedback is done from the scheduled users only, now multi-user beamformer is designed for the scheduled users based on the CSI from these users. This step may use zero-forcing beamforming for minimum mean-square error (MMSE) beamforming. Finally, data is sent to the scheduled users by using this multi-user beamforming vectors.

As described above, the user scheduling and beamformer design method, apparatus, and storage medium based on a two-stage beamformer for massive MIMO downlink according to the present invention provide a user scheduling and beamformer method superior to a random beamforming-based user scheduling method. The present invention may yield a performance gain compared to existing schemes by reducing performance degradation even in the range of the realistic number of users while optimizing a sum data rat.

The present invention may be implemented in the form of computer-readable code stored in a computer-readable storage medium. The computer-readable storage medium includes all types of recording devices that store data readable by a computer system. Examples of the computer-readable storage medium include Read Only Memory (ROM), Random Access Memory (RAM), Compact Disc ROM (CD-ROM), magnetic tape, a floppy disc, an optical data storage device, etc. Further, the program code according to the present invention may be transmitted in the form of carrier waves (for example, via transmission over the Internet). Although the preferred embodiments of the present invention have been illustrated and described, those skilled in the art will appreciate that the present invention is not limited by those embodiments and various changes and modifications are possible, without departing from the scope and spirit of the invention as disclosed in the accompanying claims. Therefore, it should be understood that those changes and modifications belong to the scope of the accompanying claims.

What is claimed is:

1. A method of scheduling transmission and beamformer design based on a two-stage beamformer for massive Multiple-Input-Multiple Output (MIMO) downlink, the method implemented by a processor of a base station, the method comprising the steps of:

a) determining a reference orthonormal set of M transmit beam vectors $V_g = [u_g^1, \ldots, u_g^M]$, $g=1, \ldots, G$, where $[u_g^1, \ldots, u_g^M]$ are orthonormal vectors, b) using the reference orthonormal set as a reference signal, c) transmitting the reference orthonormal set to downlink for a training period, d) distributing a preset threshold value $\alpha$ to a network, e) partitioning users in a subsector or group into M sets by computing an inner product between each of the reference transmit beam vector $u_g^i$, $i=1, \ldots, M$, and the user's normalized channel vector $h_{g_k}/\|h_{g_k}\|$ and comparing the inner product value to the threshold value $\alpha$, f) feeding back from each user to the base station of the index i of the largest inner product value and each user's channel norm or interference-considering channel norm, g) scheduling of a user for each reference transmit beam vector based on the feedbacked beam index and the feedbacked channel norm or modified channel norm information, h) requesting feedback of the channel state information (CSI) from only the scheduled users, i) designing multi-user beamformer for the scheduled users after the feedback of the CSI of the scheduled users to adapt the reference transmit beam vectors accurately to the CSI of the scheduled users, and j) transmitting data to the scheduled users with the adaptively designed beam vectors, wherein step e) comprises the substep:

e1) obtaining a set of the users by calculating the inner product between the normalized user's channel $h_{g_k}/\|h_{g_k}\|$ and each of orthonormal reference beam vector $u_g^i$ any by comparing the inner product value to a preset number $\alpha$ according to equation C.1:

$$W_i(\alpha) = \left\{ k : \left| (u_g^i)^H \frac{h_{g_k}^H}{\|h_{g_k}^H\|} \right| \geq \alpha, k_g \in g_g \right\} \quad (C.1)$$

and e2) obtaining a set of the users in the case of two-stage beamforming by calculating, based on the effective channel $g_{g_k}$ according to equation C.2:

$$W_i(\alpha) = \left\{ k : \left| e_{g_i}^H \frac{g_{g_k}}{\|g_{g_k}\|} \right| \geq \alpha, k \in g_g \right\} \text{ where } \frac{g_{g_k}}{\|g_{g_k}\|} \quad (C.2)$$

denotes the normalized effective channel vector of each user, $e_{g_i}$ denotes the ith standard basis vector, $\alpha$ denotes a certain positive number satisfying $0<\alpha<1$, k denotes a user index, and $G_g$ denotes the set of users belonging to group g.

2. The user scheduling method of claim 1, wherein step e) further comprises the substep of:
  e3) sharing the number $\alpha$ satisfying $0<\alpha<1$ between a base station and the users.

3. The user scheduling method of claim 1, wherein step e) is based on the feedback from users to the base station of the reference beam index i and of one of the channel norm $\|g_{g_k}\|^2$, the channel norm divided by the sum of the thermal noise power and other group interference power:

$$\frac{\|g_{g_k}\|^2}{\frac{1}{\rho} + S_g \sum_{g' \neq g} \|h_{g_k}^H V_{g'}\|^2}$$

and the channel vector $h_{g_k}$.

4. The user scheduling method of claim 3, wherein step g) comprises calculating a user index required to obtain the largest channel norm or the largest channel norm divided by the sum of the thermal noise power and the other group interference power in each partitioned user set according to equation (C.3):

$$\pi_i = \underset{k \in W_i(\alpha)}{\mathrm{argmax}} \frac{\|g_{g_k}\|^2}{\frac{1}{\rho} + M \sum_{g' \neq g} \|h_{g_k}^H V_{g'}\|^2} \quad (C.3)$$

where $\pi_i$ denotes a finally selected user index for the reference beam direction i, $\|g_{g_k}\|^2$ denotes the square of the norm of the effective channel vector of the k-th user in the g-th group, $1/\rho$ denotes the magnitude of the thermal noise, M denotes the number of data streams, and $\|h_{g_k}^H V_{g'}\|^2$ denotes a physical magnitude of an effective interference signal that is influenced by a group g'.

5. The user scheduling and beamformer design method of claim 1, wherein the beam vectors designed in step i) are not the reference beam vectors determined in step a).

6. The user scheduling and beamformer design method of claim 4, wherein step i) requires the channel state information (CSI) feedback from the scheduled users.

7. The user scheduling and beamformer design method of claim 6, wherein step i) is based on zero-forcing or minimum mean-square error (MMSE) beamforming based on the CSI feedback from the scheduled users.

* * * * *